Dec. 30, 1947.                S. C. HURLEY, JR                    2,433,558
                         INSPECTION OF ANNULAR OBJECTS
                              Filed May 25, 1944

INVENTOR.
SAMUEL C. HURLEY JR.
BY Benedict & Swartwood
ATTORNEYS

Patented Dec. 30, 1947

2,433,558

UNITED STATES PATENT OFFICE 2,433,558

INSPECTION OF ANNULAR OBJECTS

Samuel C. Hurley, Jr., Danville, Ill.

Application May 25, 1944, Serial No. 537,274

1 Claim. (Cl. 88—14)

This invention relates to the photoelectric inspection of finished surfaces of annular objects, such as piston rings. Although this invention is particularly adaptable for inspection of piston rings, it is equally applicable for the inspection of brake bands, shoes for brake bands, flat springs, and other similar objects.

One of the objects of the invention is to determine quickly and accurately the degree of irregularities in a finished surface. Another object of the invention is to determine the diameter and the concentricity of finished surfaces such as the inside and outside surfaces of piston rings. By the use of my device, I am able in one operation to inspect the irregularities in the finish, imperfections in the surface such as flat spots, the concentricity and eccentricity, and the diameter of finished surfaces such as piston rings and the like.

One embodiment of the invention comprises rotating an annular object such as a piston ring in a gauging ring inside of an inspection block containing an inspection port through which light may be passed, and if there are any irregularities such as flat spots on either surface of the piston ring, or if the inside and outside surfaces are eccentric, or if the piston ring is either too small or too large, light will shine through causing a current to pass through a photoelectric tube; and by using a suitable amplifying and indicating device, the above objects can be accomplished. Other objects of the invention will become apparent by referring to the drawings.

Fig. 1 comprises a simplified schematic diagram of the light source and optical system and a cross-sectional elevation view B of the testing or gauging block.

Figure 1:
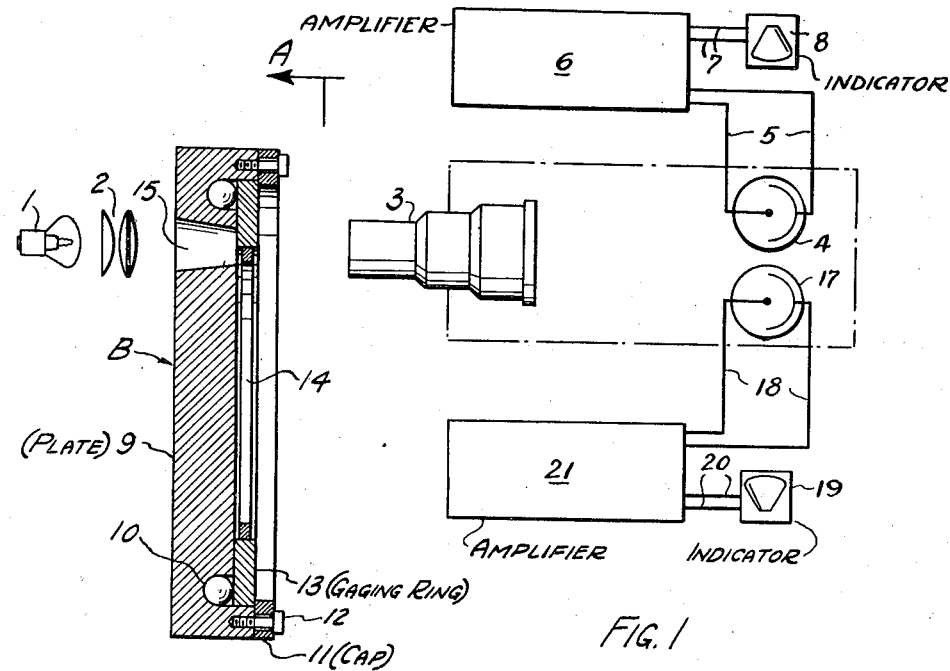
Fig. 1 illustrates the device, in part schematically and in part in detail.

Referring to the drawing, the device illustrated in Fig. 1 includes a source of light 1 shown as an electric incandescent lamp, although other suitable sources of concentrated light can be employed. The lamp 1 has its filament positioned substantially in the optical axis of a pair of condenser lenses 2 for concentrating the light of source 1 into port 15 in plate 9. Any light that is admitted between gauging ring 13 and the outside wall of piston ring 14 or between the inside wall of piston ring 14 and the lower edge of port 15 will pass through projecting lens assembly 3 mounted so as to have its optical axis in alignment with the optical axis of and on the opposite side of assembly B from the condensing lenses 2. Any light so passing through will shine upon phototube 4, positioned to receive such light, causing current to pass through tube 4. Inspection port 15 is preferably positioned such that the center of the port is on the optical axis of the lens assembly.

The inspection port 15 is also sufficiently large that its innermost edge adjacent to piston ring 14 is flush or in alignment with the piston ring. Any light passing between the inner lower edge of port 15 and the inside surface of the piston ring 14 will be projected by the projection lens 3 onto phototube 17.

Phototube 4 is connected by means of conductors or leads 5 to a suitable amplifier 6 connected with a power input not shown. The specific details of amplifier 6 are not illustrated since the details are not material to this invention. Amplifiers suitable for this purpose are readily available on the market. The output of the amplifier 6 is connected by means of leads 7 to any suitable indicating devices such as lights, bells, flags, needles, recording meters, galvanometers, A. C. meters, etc.

The phototube 17 is connected in a circuit similar to that for phototube 4. The phototube 17 is connected to the amplifier 21 through the leads 18 and the indicator 19 is connected to the amplifier 21 through the leads 20. Thus phototube 4 actuates indicator 8 to indicate an imperfect outside diameter of the piston ring 14, and the phototube 17 actuates indicator 19 to indicate an imperfect inside diameter of the piston ring 14.

Although either phototubes or photocells may be used in my invention, phototubes are preferable when used in conjunction with the amplifier shown in Fig. 1. When photocells are used, it is preferable to eliminate the amplifier and the photocells will be connected in conventional form directly to the indicator 8.

Referring to the mechanical assembly B, the article to be inspected, for example a piston ring, is placed within the proper sized gauging ring 13. The gauging ring 13 is held in place by means of cap 11, which is fastened to plate 9 by means of screws 12. The gauging ring rests upon roller bearings 10 in order that the gauging ring containing the piston ring 14 can be readily rotated for a complete inspection of the inside and outside surfaces of the piston ring.

Figure 2:
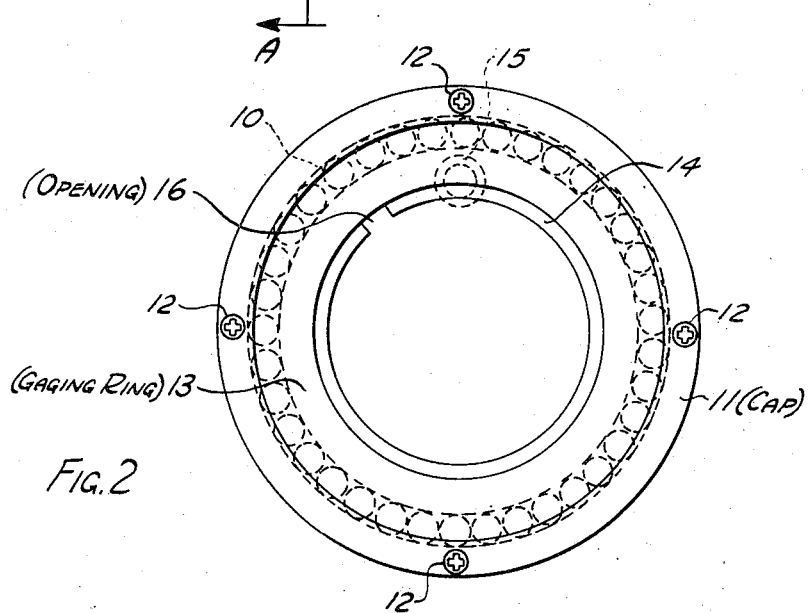
Fig. 2 is another view of the testing block along line A—A in Fig. 1.

Piston rings are made in a complete ring and then a portion of the ring is cut out, leaving opening 16 as indicated in Fig. 2. My method of inspecting the ring for smoothness, concentricity, and proper diameter is as follows: The ring is placed within gauging ring 13 with the opening in the piston ring at a point slightly to one side of the port 15. Various sized rings may be inspected by varying the size of the gauging ring and the size and location of port opening 15. Thus inspection of rings of differing thickness may be accomplished. The gauging ring containing the piston ring is then rotated either by hand or by suitable power means as much of a complete revolution as possible without allowing opening 16 to pass inspection port 15. If there are any flat spots or if the piston ring does not have the proper smoothness within the permissible tolerance or if the ring is not concentric, i. e. the inside and outside walls not parallel within the tolerance, light will pass through the assembly B and projection lens 3 causing light to fall on phototube 4.

If the outside diameter of the piston ring is too small or too large, or if there are any imperfections or flat spots, etc., in the outside wall, more light than that within the permissible tolerance will pass between the gauging ring 13 and the outer wall of piston ring 14, actuating the indicator 8, and the piece must be rejected.

The port 15 being sufficiently large that if the inside diameter of the piston ring is too small, light will shine therethrough and phototube 17 will receive light from the projection lens 3. Thus the piston ring 14 can be inspected for concentricity and for smoothness and perfection of the inside wall of the ring.

When the phototube 4 receives light thus admitted due to an imperfect piston ring, the current so passed through tube 4 will be amplified by means of amplifier 6, causing the indicator 8 to be actuated, which will inform the operator that the piece is imperfect and must be rejected. This inspection operation also determines whether or not the piston ring is of the proper diameter. If the piston ring is of the proper diameter, it will fit snugly within the gauging ring 13 and will not permit any light except that within the allowable tolerance to be cast upon phototube 4. If the piston ring is too large, it will have to be compressed in order to be contained within gauging ring 13, causing the ring to be no longer a perfect circle and at some point during the rotation of the piston ring through one revolution, light will shine through assembly B and projection lens 3, causing a current to flow through tube 4, actuating the indicating means 8 which will show that the piece is not of the proper diameter. In a like manner, the device will indicate if the diameter of the piston ring is too small, since more light than the specified tolerance will pass through the lens 3 to the tube 4 causing the indicator 8 to be actuated.

To make allowance for the proper tolerance for eccentricity, smoothness, flat spots, imperfections in the surface, and diameter, phototube 4 and amplifier 6 are so adjusted that some light may pass through assembly B and will be projected by means of lens 3 on the tube 4; but the amount of current which passes through tube 4, after being amplified by amplifier 6, would not be sufficiently great to actuate the indicator device 8. If more light passes through than that within the permissible tolerance, indicator 8 will be actuated as described above, and the piece must be rejected.

In like manner just described for the tests that can be made in which phototube 4 is responsive to certain conditions of light, phototube 17 functions to determine rough spots, concentricity of the inside diameter of the piston ring.

While I have described and illustrated the preferred embodiments of my invention, it is understood that details may be varied and the description is not intended to limit the scope of my invention.

I claim as my invention:

An apparatus for inspecting annular objects such as piston rings, comprising a support, means adjacent the edge of said support providing an inspection window or port, a gauge mounted for rotation on said support about an axis parallel to the axis of said window and spaced inwardly of said window, said gauge having a central object-receiving opening of predetermined diameter and shape, and adapted to receive the object to be inspected with its outer wall engaging the wall of the opening, so that light may pass therebetween wherever the walls are not in contact, said inspection window being positioned relative to said gauge so that the contacting walls of the opening and the object are aligned therewith, means for projecting a beam of light through said window, said window being positioned so as to project a portion of said beam along the inner and outer walls of the annular object, a light sensitive device mounted to receive light passing the inner wall of said object, a second light sensitive device positioned to receive any light passing between the outer wall of the object to be inspected and the inner wall of the object-receiving opening, and means for determining the state of illumination of each of the light sensitive devices.

SAMUEL C. HURLEY, Jr.

REFERENCES CITED

The following references are of record in the file of this patent:

UNITED STATES PATENTS

| Number | Name | Date |
|---|---|---|
| 1,332,571 | Ray | Mar. 2, 1920 |
| 1,455,864 | Busick | May 22, 1923 |
| 1,640,567 | Firestone | Aug. 30, 1927 |